(12) United States Patent
Williams

(10) Patent No.: US 8,302,565 B2
(45) Date of Patent: Nov. 6, 2012

(54) ANIMAL GARMENT

(76) Inventor: Lisa Z. Williams, Bernville, PA (US)

( * ) Notice: Subject to any disclaimer, the term of this patent is extended or adjusted under 35 U.S.C. 154(b) by 0 days.

(21) Appl. No.: 13/051,226

(22) Filed: Mar. 18, 2011

(65) Prior Publication Data

US 2011/0226193 A1  Sep. 22, 2011

Related U.S. Application Data

(60) Provisional application No. 61/340,474, filed on Mar. 18, 2010.

(51) Int. Cl.
*A01K 23/00* (2006.01)
(52) U.S. Cl. .......................... 119/868; 119/850
(58) Field of Classification Search .................. 119/850, 119/854, 856, 863, 867, 868, 869; 54/79.1, 54/79.2, 79.3, 79.4; D30/144, 145
See application file for complete search history.

(56) References Cited

U.S. PATENT DOCUMENTS

| | | | | |
|---|---|---|---|---|
| 2,974,635 A | * | 3/1961 | McDowell | 119/854 |
| 4,290,386 A | * | 9/1981 | Eiriksson | 119/868 |
| 6,142,105 A | * | 11/2000 | McKnight | 119/850 |
| 6,368,313 B1 | * | 4/2002 | Howard | 604/385.09 |
| 6,557,497 B1 | * | 5/2003 | Milligan | 119/850 |
| 6,895,901 B1 | * | 5/2005 | Howard | 119/869 |
| 7,044,087 B1 | * | 5/2006 | Brecheen | 119/868 |
| 7,063,046 B1 | * | 6/2006 | Lin | 119/854 |
| 2004/0237480 A1 | * | 12/2004 | Keiner | 54/79.2 |
| 2004/0244727 A1 | * | 12/2004 | Brewington | 119/869 |
| 2010/0031898 A1 | * | 2/2010 | Page | 119/850 |
| 2010/0199927 A1 | * | 8/2010 | Cigard et al. | 119/850 |

* cited by examiner

*Primary Examiner* — T. Nguyen
(74) *Attorney, Agent, or Firm* — Pandiscio & Pandiscio

(57) ABSTRACT

A garment for animals includes a first panel of flexible material attachable to a second panel of flexible material, the first and second panels being connectable to each other by adjustable chest, body and tail fittings, such that the garment can be configured in situ to fit various sizes and shapes of animals, such as dogs. The garment is adapted to receive a disposable pad on an underside of the garment on the animal.

7 Claims, 7 Drawing Sheets

ANIMAL GARMENT

CROSS-REFERENCE TO RELATED APPLICATION

This application claims the benefit of U.S. Provisional Patent application 61/340,474, filed Mar. 18, 2010 in the name of Lisa Z. Williams.

BACKGROUND OF THE INVENTION

1. Field of the Invention

This invention relates to a garment for animals, who reside in, or visit, human habitats, such as houses and apartments, and the like.

More specifically, the invention relates to an adjustable dog diaper garment adapted to be worn by such animals, and worn in conjunction with selected disposable pads. The garment includes an adjustable chest portion worn around the animal's neck, an adjustable body portion, and an adjustable tail portion that allows the garment to be easily adjusted to provide comfort for the dog and a secure customizable fit to enhance effectiveness by preventing slippage or escape. The garment precludes the inconvenience of soiling, and damage caused by indoor dog urination. The dog owner or caregiver can selectively vary the type of disposable pad used with the adjustable dog diaper garment, depending upon the amount of liquid waste produced by the animal. In addition, when worn by a male dog, or a non-spayed female dog in heat, the adjustable dog diaper garment prevents mating.

2. Description of the Prior Art

While the owners of dogs love their dogs, no one likes the inconvenience of soiling and/or damage caused by indoor urination. Dogs and other animals may experience a temporary or permanent inability to control urinary discharge. This may be due to advanced age, a medical condition or surgery, submissive or excitable urination, male dog marking, or the dog not being housebroken. This incontinence can lead to indoor dog urination and the damage resulting therefrom.

A number of dog diapers are available that seek to address this problem. However, many existing diapers tend to be ineffective as they cannot be adequately adjusted to fit the dog securely, to prevent slipping or escape, and the user cannot vary the type of disposable pad used with the dog diaper to take into account the amount of liquid waste produced by the animal. Disposable dog diapers may be expensive, and reusable diapers must be removed from the dog and washed frequently.

There thus exists a continuing need for a new and improved dog diaper which is effective in precluding the inconvenience and damage caused by indoor dog urination, and when worn by a male dog, or when worn by a non-spayed female dog in heat, will prevent mating. The present invention, namely an adjustable dog diaper garment, provides a garment which is adjustable to provide comfort for the dog, and a secure, customized fit to enhance effectiveness by preventing slippage or escape. In addition, the adjustable pet diaper garment allows the pet owner, or caregiver, to vary the type of disposable pad used to collect and contain the liquid waste. The cost of use is low because it is only the disposable pad that is changed regularly. The disposable pad can be replaced easily and the adjustable dog diaper garment does not need to be washed as frequently as a typical dog diaper with integral absorbent material.

SUMMARY OF THE INVENTION

In view of the disadvantages inherent in the known types of designs and configurations of diaper-type garments, the present invention provides a new and improved garment for dealing with the inconvenience, soiling and damage caused by indoor dog urination.

The improved garment includes a first panel of flexible material attached to a second panel of flexible material, the first and second panels being connectable to each other by a selectively adjustable chest fitting, a selectively adjustable body fitting, and a selectively adjustable tail fitting, such that the garment can be configured in situ to fit various sizes and shapes of animal bodies. The garment is adapted to receive a disposable pad on an underside of the garment on the animal.

The invention thus provides an adjustable dog diaper garment that can be easily adjusted to provide comfort for the dog and a secure, customizable fit to enhance effectiveness by preventing slippage or escape. In addition, the pet owner or caregiver can vary the type of disposable pad used with the adjustable dog diaper garment, depending upon the amount of liquid waste produced by the animal. The adjustable dog diaper garment as described provides a means to effectively preclude the inconvenience of soiling and damage caused by indoor dog urination and, when worn by a male dog, or a non-spayed female dog in heat, can prevent mating.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
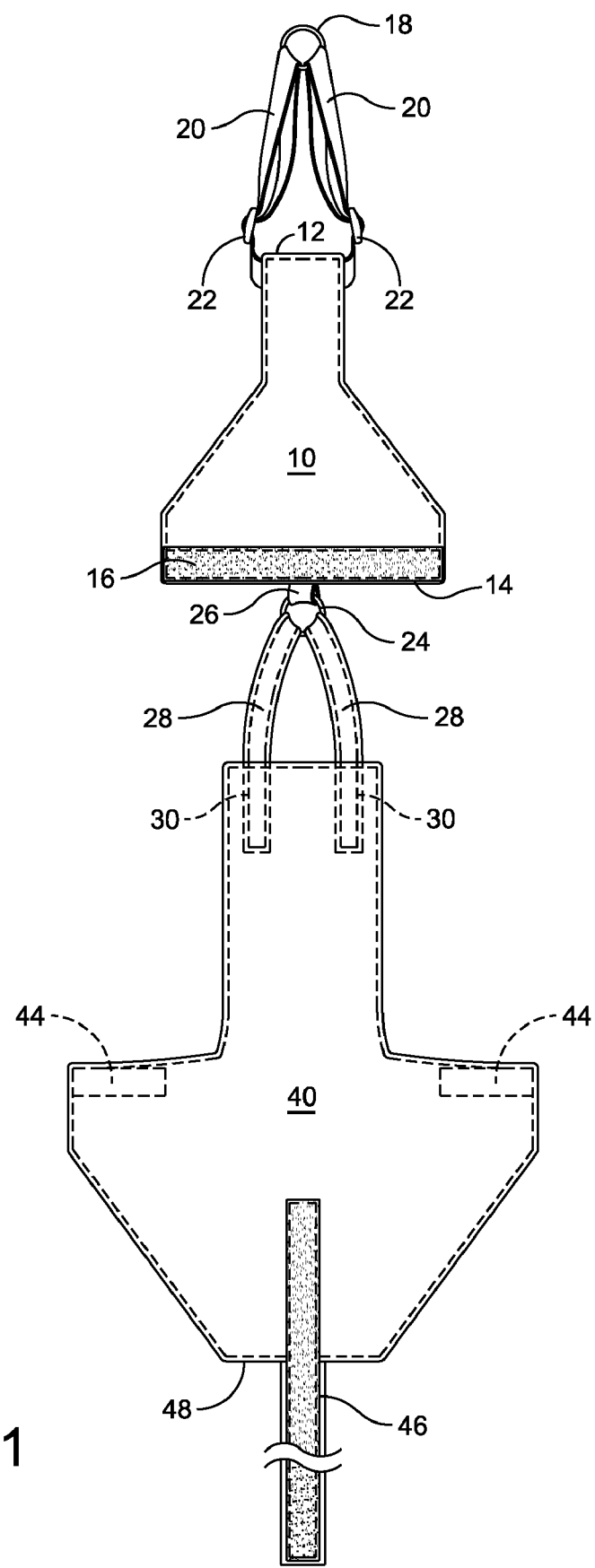
FIG. 1 is a top plan view of an article of clothing for animals.

The garment is adapted for wear indoors by an animal to prevent soiling of rugs, furniture, and the like. Referring to the drawings, the garment includes a first panel 10 of flexible material and having a generally straight front edge 12 of a first length and a rear edge 14 of a second longer length, a hermaphroditic band 16 extends along the rear edge 14, and a ring 18 is connected by shoulder straps 20 to panel 10. The shoulder straps 20 extend from either side of the front edge 12, each are provided with means thereon for adjusting the lengths thereof, such as buckles 22. The straps 20 define loops spaced from the first panel 10, for connection to the ring 18.

A ring 24 is connected to the rear edge 14 of the first panel 10 by way of a strap loop 26 fixed to and extending from the rear edge 14. Straps 28 are mounted on the loop 26 and are provided with hermaphroditic connecting means 30 thereon.

Figure 2:
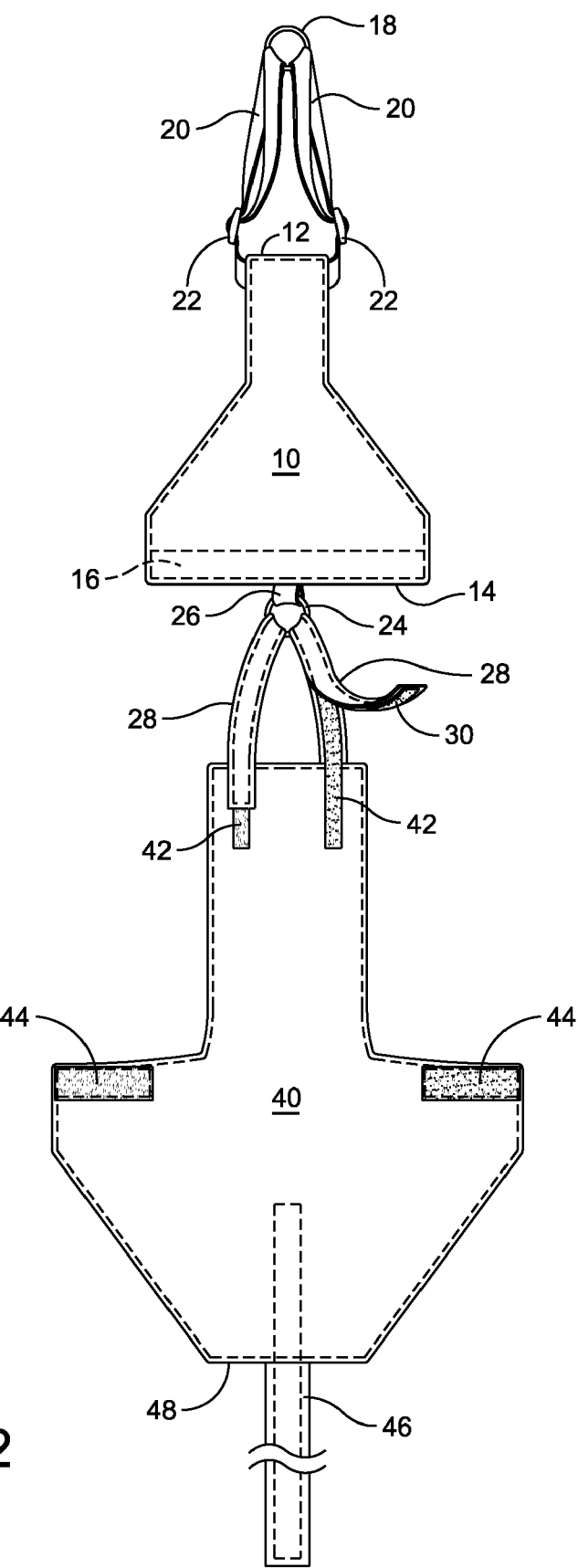
FIG. 2 is a bottom plan view thereof.
Figure 3:
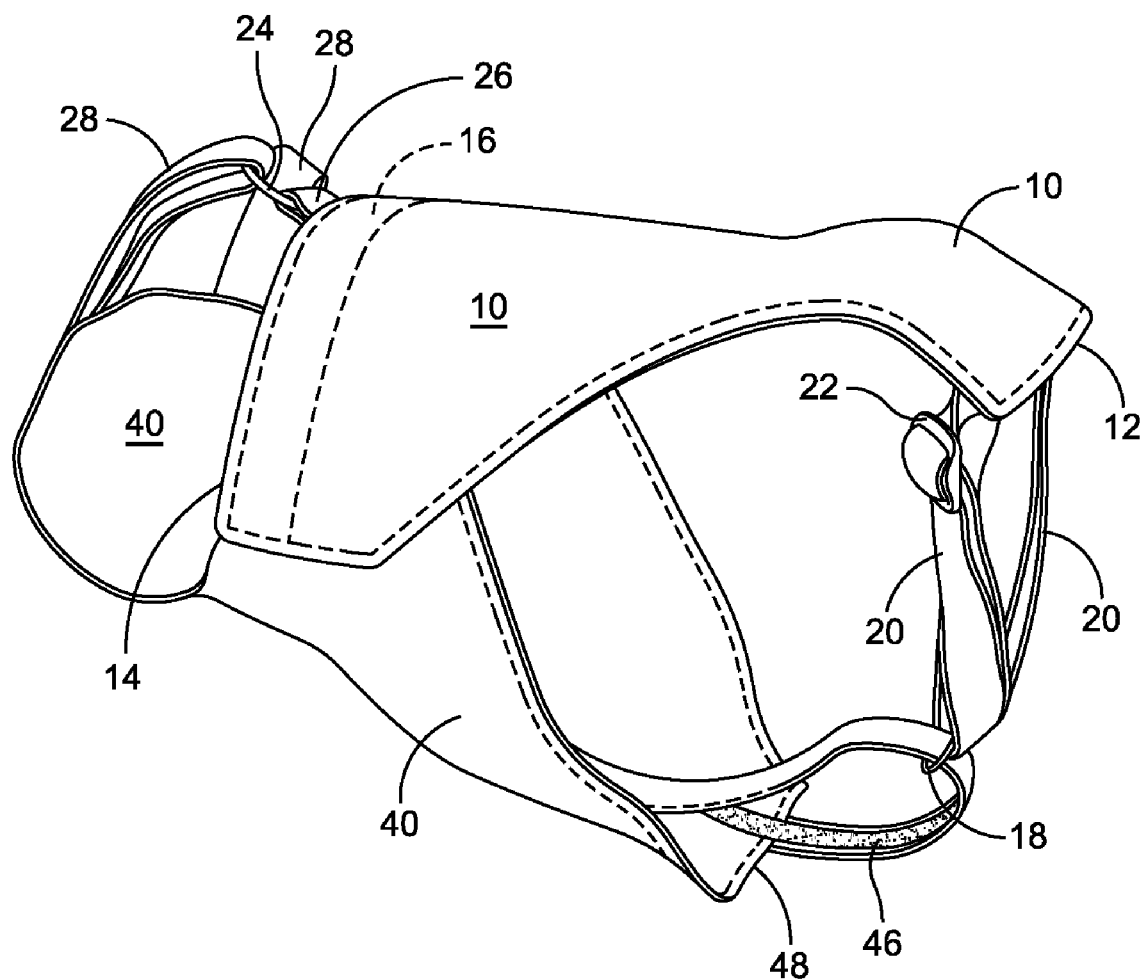
FIG. 3 is a right side elevational view thereof.
Figure 4:
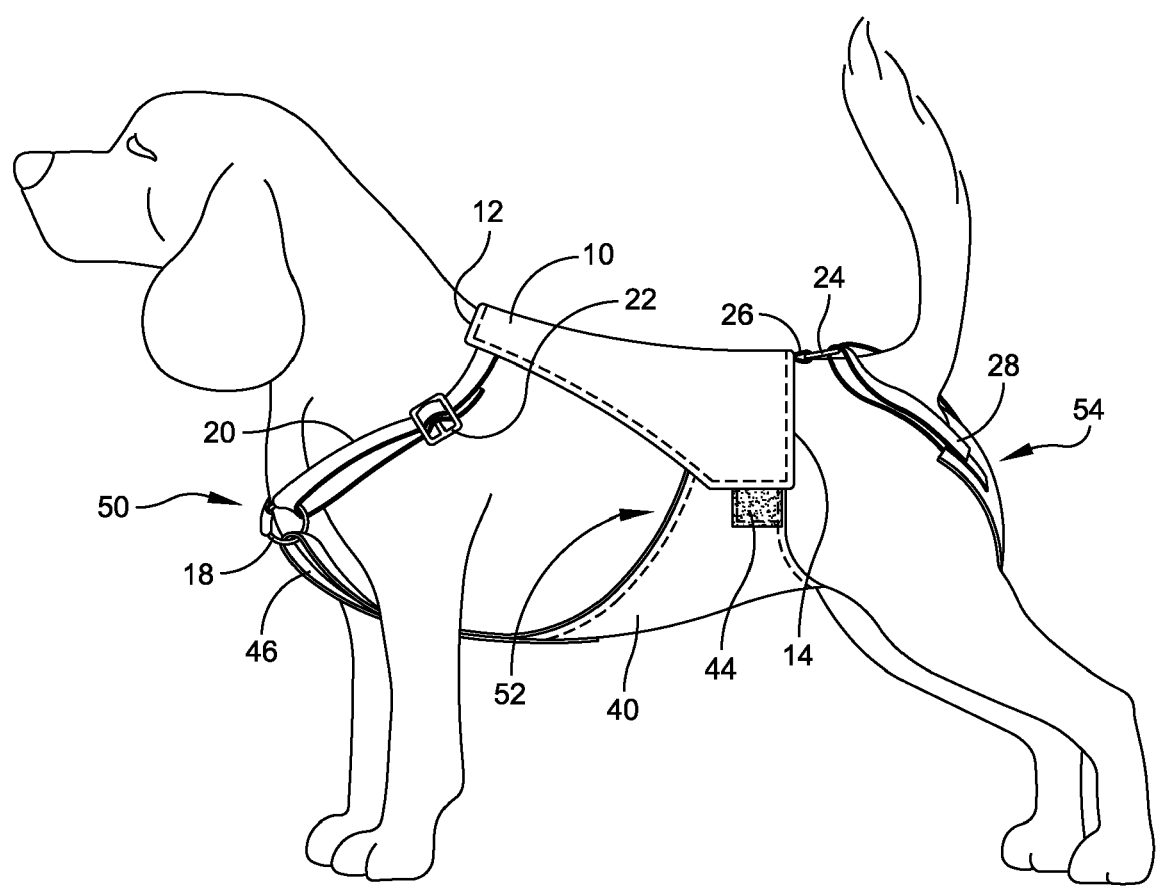
FIG. 4 is a left side elevational view thereof, showing the article of clothing on a dog.
Figure 5:
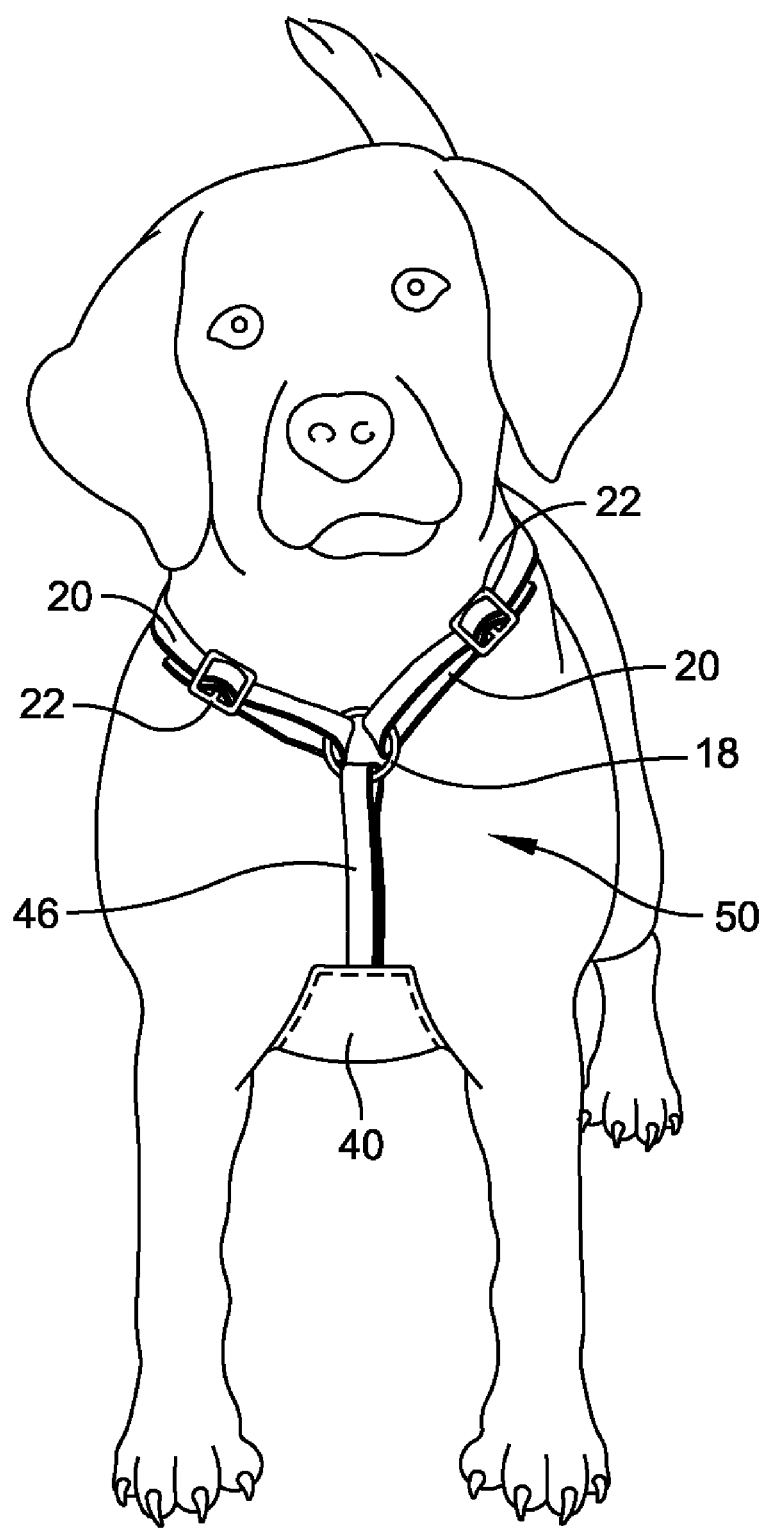
FIG. 5 is a front elevational view thereof, shown on a dog.
Figure 6:
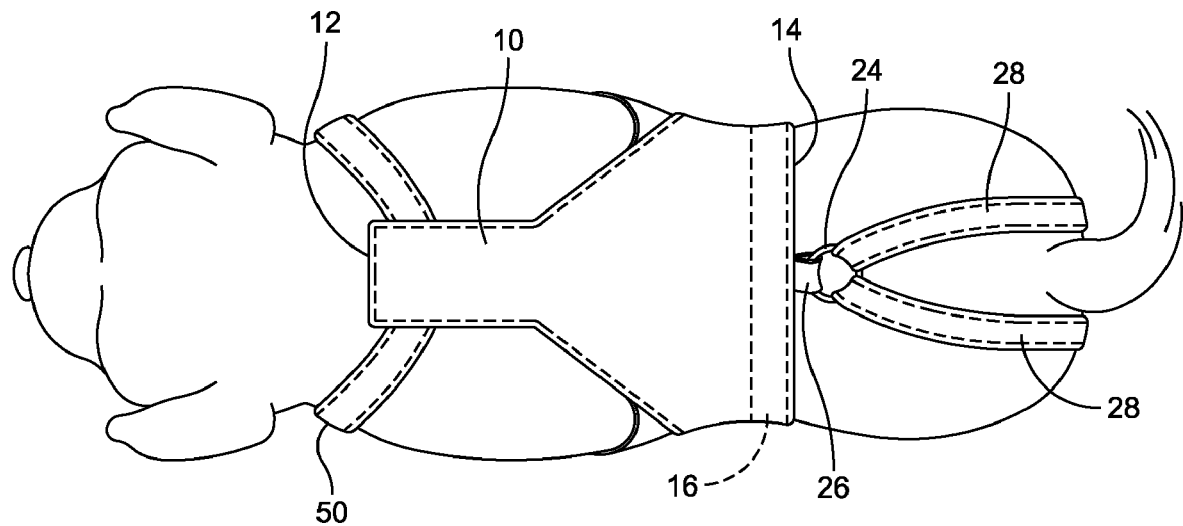
FIG. 6 is a top elevational view thereof, shown on a dog.
Figure 7:
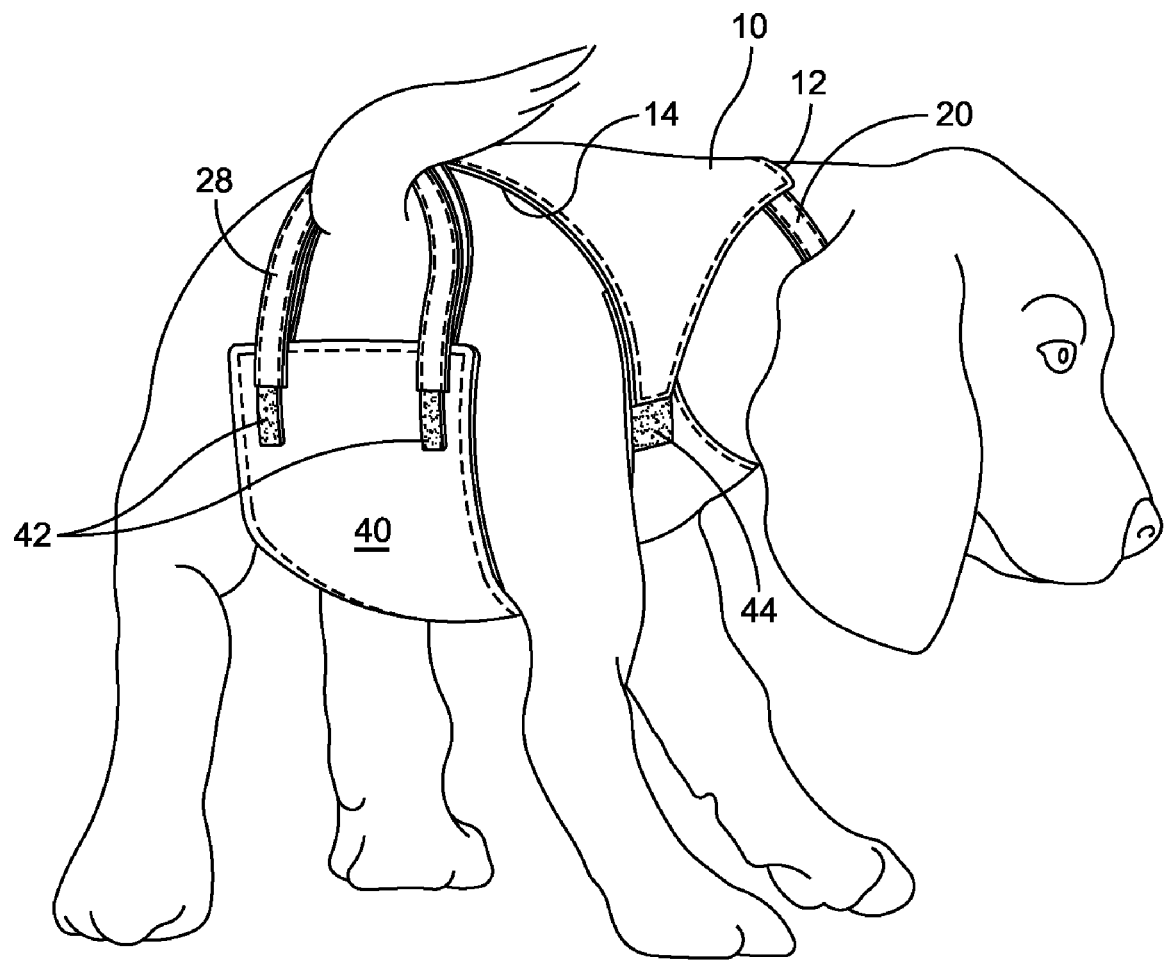
FIG. 7 is a rear elevational view thereof, shown on a dog.

A second panel 40 of flexible material is provided having mounted thereon hermaphroditic straps 42 (FIG. 2) for connection to straps 28, and hermaphroditic fasteners 44. The second panel 40 is further provided with a hermaphroditic strap 46 extending outwardly from a rearward edge 48.

As can be seen in FIGS. 4-7, the garment includes an adjustable chest fitting 50, including the straps 20 and 46 and slide-through ring 18, and adjustable body fitting 52, including the fasteners 16 and 44, and an adjustable tail fitting 54, including straps 28 and fastener 42.

In the chest fitting 50, straps 20 and 42 can be adjusted and set by buckles 22 to conform to the chest configuration of a particular dog.

Similarly, the fasteners 16 and 44 can be adjusted and interconnected to conform to the body area of the dog, and the tail fitting 54 can be adjusted by positioning of the straps 28 and 42 to conform to the rear area of the dog.

The body fitting 52 includes a length-setting feature wherein the straps 28 and 42 are adjustable length-wise to accommodate the length of the first and second panels to the length of the body of the animal.

In positioning the body and tail fittings 52, 54, room is provided between the second panel 40 and the underside of the dog for positioning of a disposable pad (not shown) disposed to receive urine from the dog and/or to prevent male dogs and non-spayed female dogs from mating.

It is to be understood that the present invention is by no means limited to the particular construction herein disclosed and/or shown in the drawings, but also comprises any modification or equivalent within the scope of the claims.

What is claimed is:

1. A garment for animals residing in, or visiting in, human habitats, the garment comprising:
    a back panel of flexible material and an underside panel of flexible material, said back and underside panels being adapted to overlap each other and connectable to each other by a chest fitting, a body fitting and a tail fitting,
    the chest fitting comprising strap means extending from said back panel and strap means extending from forward edges of said underside panel,
    the body fitting comprising hermaphroditic fasteners disposed on overlapping portions of said back and underside panels and selectively joinable together so as to encircle a mid section of the body of the animal; and
    the tail fitting comprising strap means interconnecting said back and underside panels and extendible along both sides of a tail of the animal and adjustable as to lengths so as to extend over a rump portion of the animal;
    said back and underside panels being selectively interconnectable to provide for coverage of disparate sizes of animals; wherein said underside panel is adapted to support a disposable pad on an underside of the animal to prevent spoiling of the environment outside of the animal.

2. The animal garment in accordance with claim 1 wherein said strap means extending from said back panel and said strap means extending from said underside panel are connectable to a common ring.

3. The animal garment in accordance with claim 2 wherein said strap means extending from said back panel are provided with a buckle for selective adjustment of the length of said strap means.

4. The animal garment in accordance with claim 1 wherein said fasteners comprise first fastening means on said back panel and a complementary second fastening means on said underside panel, said first and second fastening means being interconnectable.

5. The animal garment in accordance with claim 1 wherein said tail fitting strap means comprise first and second tail straps extending from said underside panel and interconnecting with a ring attached to said back panel.

6. The animal garment in accordance with claim 1 wherein said body fitting further comprises a widthwise adjustment means comprising fastener portions disposed on said back and underside panels and having the hermaphroditic fastening means thereon, the portions facilitating lengthening and shortening of the overall width of the joined back and underside panels.

7. The animal garment in accordance with claim 1 wherein said body fitting further comprises a lengthwise adjustment means comprising strap means adapted to extend from said back panel and strap means adapted to extend from said belly panel, said straps means being provided with the hermaphroditic fasteners such that the length of the back panel strap means is adjustable, whereby to facilitate lengthening or shortening of the overall length of the joined back and underside panels.

* * * * *